(12) United States Patent
Park et al.

(10) Patent No.: US 12,204,169 B2
(45) Date of Patent: *Jan. 21, 2025

(54) LENS DRIVING APPARATUS

(71) Applicant: LG INNOTEK CO., LTD., Seoul (KR)

(72) Inventors: Sang Ok Park, Seoul (KR); Sang Jun Min, Seoul (KR); Sang Hee Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 228 days.

This patent is subject to a terminal disclaimer.

(21) Appl. No.: 17/933,689

(22) Filed: Sep. 20, 2022

(65) Prior Publication Data
US 2023/0012336 A1 Jan. 12, 2023

Related U.S. Application Data

(63) Continuation of application No. 16/880,212, filed on May 21, 2020, now Pat. No. 11,474,323, which is a
(Continued)

(30) Foreign Application Priority Data

Dec. 13, 2006 (KR) .......................... 10-2006-0127435
Dec. 13, 2006 (KR) .......................... 10-2006-0127436

(51) Int. Cl.
*G02B 7/04* (2021.01)
*E21B 36/00* (2006.01)
(Continued)

(52) U.S. Cl.
CPC .............. *G02B 7/04* (2013.01); *E21B 36/001* (2013.01); *G02B 7/023* (2013.01); *G02B 7/026* (2013.01);
(Continued)

(58) Field of Classification Search
CPC .......... G02B 7/04; G02B 7/023; G02B 7/026; E21B 36/001; G03B 13/34; H02K 33/02; H02K 41/0356; H04N 23/55
See application file for complete search history.

(56) References Cited

U.S. PATENT DOCUMENTS 4,566,089 A 1/1986 Kime
5,471,100 A 11/1995 Sakamoto et al.
(Continued)

FOREIGN PATENT DOCUMENTS

CN 1504822 A 6/2004
CN 1713015 A 12/2005
(Continued)

OTHER PUBLICATIONS

U.S. Appl. No. 16/880,212, filed May 21, 2020.
(Continued)

*Primary Examiner* — James C. Jones
(74) *Attorney, Agent, or Firm* — SALIWANCHIK, LLOYD & EISENSCHENK

(57) ABSTRACT

Disclosed is a lens driving apparatus. The lens driving apparatus includes a base formed at a center thereof with a first opening; a housing coupled with the base and having a second opening corresponding to the first opening; a yoke installed on the base and including a horizontal plate having a third opening corresponding to the first opening and a vertical plate protruding upward from the horizontal plate; a bobbin movably installed in the yoke and coupled with a lens module; a coil fixedly disposed around the bobbin; a plurality of magnets provided at the vertical plate of the yoke to face the coil; and a spring installed on at least one of upper and lower portions of the yoke to return the bobbin, which has moved up due to interaction between the magnet and the coil, to its initial position.

19 Claims, 2 Drawing Sheets

Related U.S. Application Data continuation of application No. 16/207,699, filed on Dec. 3, 2018, now Pat. No. 10,698,173, which is a continuation of application No. 15/987,606, filed on May 23, 2018, now Pat. No. 10,146,026, which is a continuation of application No. 15/449,356, filed on Mar. 3, 2017, now Pat. No. 10,007,082, which is a continuation of application No. 15/008,496, filed on Jan. 28, 2016, now Pat. No. 9,618,722, which is a continuation of application No. 14/632,758, filed on Feb. 26, 2015, now Pat. No. 9,256,049, which is a continuation of application No. 13/952,230, filed on Jul. 26, 2013, now Pat. No. 9,019,624, which is a continuation of application No. 13/659,185, filed on Oct. 24, 2012, now Pat. No. 9,250,414, which is a continuation of application No. 13/302,547, filed on Nov. 22, 2011, now Pat. No. 8,300,330, which is a continuation of application No. 13/051,291, filed on Mar. 18, 2011, now Pat. No. 8,089,703, which is a continuation of application No. 12/518,976, filed as application No. PCT/KR2007/006466 on Dec. 12, 2007, now Pat. No. 7,936,526.

(51) Int. Cl.
  G02B 7/02    (2021.01)
  G03B 13/34   (2021.01)
  H02K 33/02   (2006.01)
  H02K 41/035  (2006.01)
  H04N 23/55   (2023.01)

(52) U.S. Cl.
  CPC ............ G03B 13/34 (2013.01); H02K 33/02 (2013.01); H02K 41/0356 (2013.01); H04N 23/55 (2023.01)

(56) References Cited

U.S. PATENT DOCUMENTS

| | | | |
|---|---|---|---|
| 6,034,940 A | 3/2000 | Lee | |
| 6,591,066 B2 | 7/2003 | Aoshima et al. | |
| 6,710,563 B2 | 3/2004 | Mizumaki et al. | |
| 6,800,970 B2 | 10/2004 | Aoshima et al. | |
| 7,298,562 B2 | 11/2007 | Sue et al. | |
| 7,649,703 B2 | 1/2010 | Shiraki et al. | |
| 9,256,049 B2 | 2/2016 | Park et al. | |
| 2004/0130808 A1 | 7/2004 | Yoneyama et al. | |
| 2005/0286352 A1 | 12/2005 | Inui | |
| 2006/0028929 A1 | 2/2006 | Osaka | |
| 2006/0034599 A1 | 2/2006 | Osaka | |
| 2006/0181632 A1 | 8/2006 | Makii et al. | |
| 2006/0181748 A1 | 8/2006 | Makii et al. | |
| 2006/0214520 A1 | 9/2006 | Tseng | |
| 2006/0245085 A1* | 11/2006 | Lee ........................ G02B 7/08 359/813 | |
| 2006/0275032 A1 | 12/2006 | Hong et al. | |
| 2007/0159010 A1 | 7/2007 | Su et al. | |
| 2007/0247539 A1 | 10/2007 | Ho et al. | |
| 2008/0117536 A1 | 5/2008 | Higuchi | |
| 2008/0157609 A1 | 7/2008 | Wang | |
| 2009/0237815 A1 | 9/2009 | Kim | |

FOREIGN PATENT DOCUMENTS

| | | | |
|---|---|---|---|
| DE | 202006009115 U1 | 8/2006 | |
| JP | 62-125545 A | 6/1987 | |
| JP | 10-334493 A | 12/1998 | |
| JP | 2000-275490 A | 10/2000 | |
| JP | 2005-128405 A | 5/2005 | |
| JP | 2005-234089 A | 9/2005 | |
| JP | 2005-258355 A | 9/2005 | |
| JP | 2006-079072 A | 3/2006 | |
| JP | 3124292 U | 7/2006 | |
| JP | 2006-234866 A | 9/2006 | |
| JP | 2008-026431 A | 2/2008 | |
| KR | 10-0649638 B1 | 11/2006 | |
| TW | M285846 U | 1/2006 | |
| TW | 200622466 A | 7/2006 | |
| TW | 265668 B | 11/2006 | |
| WO | 2005/088153 A1 | 9/2005 | |
| WO | WO-2008063019 A1 * | 5/2008 | ......... G02B 27/0006 |

OTHER PUBLICATIONS

U.S. Appl. No. 16/207,699, filed Dec. 3, 2018, now U.S. Pat. No. 10,698,173, issued Jun. 30, 2020.
U.S. Appl. No. 15/987,606, filed May 23, 2018, now U.S. Pat. No. 10,146,026, issued Dec. 4, 2018.
U.S. Appl. No. 15/449,356, filed Mar. 3, 2017, now U.S. Pat. No. 10,007,082, issued Jun. 26, 2018.
U.S. Appl. No. 15/008,496, filed Jan. 28, 2016, now U.S. Pat. No. 9,618,722, issued Apr. 11, 2017.
U.S. Appl. No. 14/632,758, filed Feb. 26, 2015, now U.S. Pat. No. 9,256,049, issued Feb. 9, 2016.
U.S. Appl. No. 13/952,230, filed Jul. 26, 2013, now U.S. Pat. No. 9,019,624, issued Apr. 28, 2015.
U.S. Appl. No. 13/659,185, filed Oct. 24, 2012, now U.S. Pat. No. 9,250,414, issued Feb. 2, 2016.
U.S. Appl. No. 13/302,547, filed Nov. 22, 2011, now U.S. Pat. No. 8,300,330, issued Oct. 30, 2012.
U.S. Appl. No. 13/051,291, filed Mar. 18, 2011, now U.S. Pat. No. 8,089,703, issued Jan. 3, 2012.
U.S. Appl. No. 12/518,976, filed Jun. 12, 2009, now U.S. Pat. No. 7,936,526, issued May 3, 2011.
Office Action dated Nov. 1, 2011 in Japanese Application No. 2009-541226, filed Dec. 12, 2007.
Office Action dated Apr. 23, 2012 in Korean Application No. 10-2006-0127435, filed Dec. 13, 2006.
Office Action dated Apr. 23, 2012 in Korean Application No. 10-2006-0127436, filed Dec. 13, 2006.
Notice of Allowance dated Oct. 30, 2012 in Korean Application No. 10-2006-0127435, filed Dec. 13, 2006.
Patent Certificate dated May 8, 2013 in Chinese Application No. 200780049087.X, filed Dec. 12, 2007.
Office Action dated Feb. 21, 2014 in Taiwanese Application No. 102139064.
Office Action dated Jul. 16, 2013 in Taiwanese Patent Application No. 096147552, filed Dec. 12, 2007.
Office Action dated Feb. 3, 2015 in Chinese Patent Application No. 201310119692.7.
Office Action dated Apr. 3, 3015 in U.S. Appl. No. 14/632,758.
Office Action dated Jun. 10, 2019 in U.S. Appl. No. 16/207,699.
Notice of Allowance dated Feb. 21, 2020 in U.S. Appl. No. 16/207,699.
Office Action dated Jul. 9, 2010 in U.S. Appl. No. 12/518,976.
Notice of Allowance dated Dec. 17, 2010 in U.S. Appl. No. 12/518,976.
Office Action dated Jun. 22, 2011 in U.S. Appl. No. 13/051,291.
Notice of Allowance dated Nov. 3, 2011 in U.S. Appl. No. 13/051,291.
Office Action dated Jan. 9, 2012 in U.S. Appl. No. 13/302,547.
Notice of Allowance dated Jun. 26, 2012 in U.S. Appl. No. 13/302,547.
Office Action dated Jan. 18, 2013 in U.S. Appl. No. 13/659,185.
Notice of Allowance dated Apr. 30, 2013 in U.S. Appl. No. 13/659,185.
Office Action dated May 23, 2014 in U.S. Appl. No. 13/659,185.
Notice of Allowance dated Nov. 7, 2014 in U.S. Appl. No. 13/659,185.
Office Action dated Mar. 27, 2015 in U.S. Appl. No. 13/659,185.
Notice of Allowance dated Oct. 6, 2015 in U.S. Appl. No. 13/659,185.
Office Action dated Oct. 10, 2013 in U.S. Appl. No. 13/952,230.
Office Action dated May 22, 2014 in U.S. Appl. No. 13/952,230.
Notice of Allowance dated Nov. 21, 2014 in U.S. Appl. No. 13/952,230.
Notice of Allowance dated Oct. 1, 2015 in U.S. Appl. No. 14/632,758.
Office Action dated Jul. 13, 2016 in U.S. Appl. No. 15/008,496.

(56) References Cited

OTHER PUBLICATIONS

Notice of Allowance dated Nov. 28, 2016 in U.S. Appl. No. 15/008,496.
Office Action dated Aug. 11, 2017 in U.S. Appl. No. 15/449,356.
Notice of Allowance dated Feb. 23, 2018 in U.S. Appl. No. 15/449,356.
Notice of Allowance dated Mar. 20, 2018 in U.S. Appl. No. 15/449,356.
Notice of Allowance dated Jul. 30, 2018 in U.S. Appl. No. 15/987,606.
European Search Report dated Jul. 23, 2020 in European Application No. 20165307.8.
Office Action dated Mar. 2, 2022 in U.S. Appl. No. 16/880,212.
Notice of Allowance dated Jun. 13, 2022 in U.S. Appl. No. 16/880,212.

* cited by examiner

[Fig. 1]
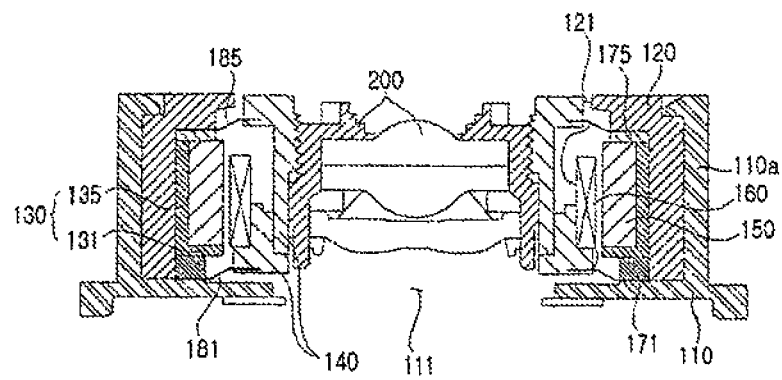
[Fig. 2]
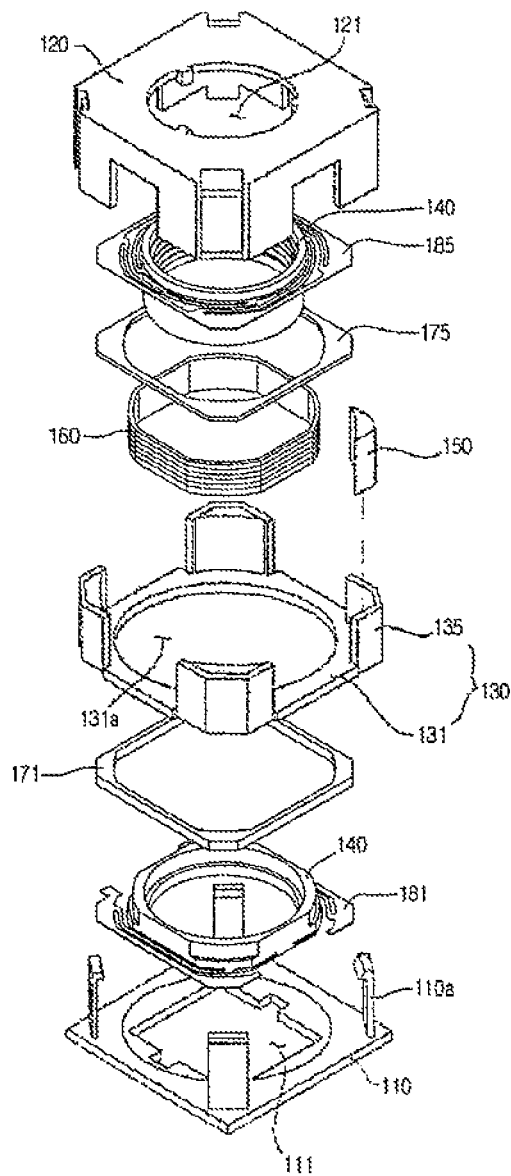

[Fig. 3]
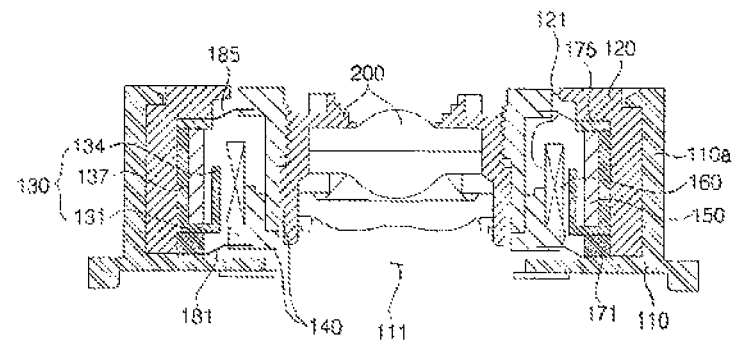
[Fig. 4]
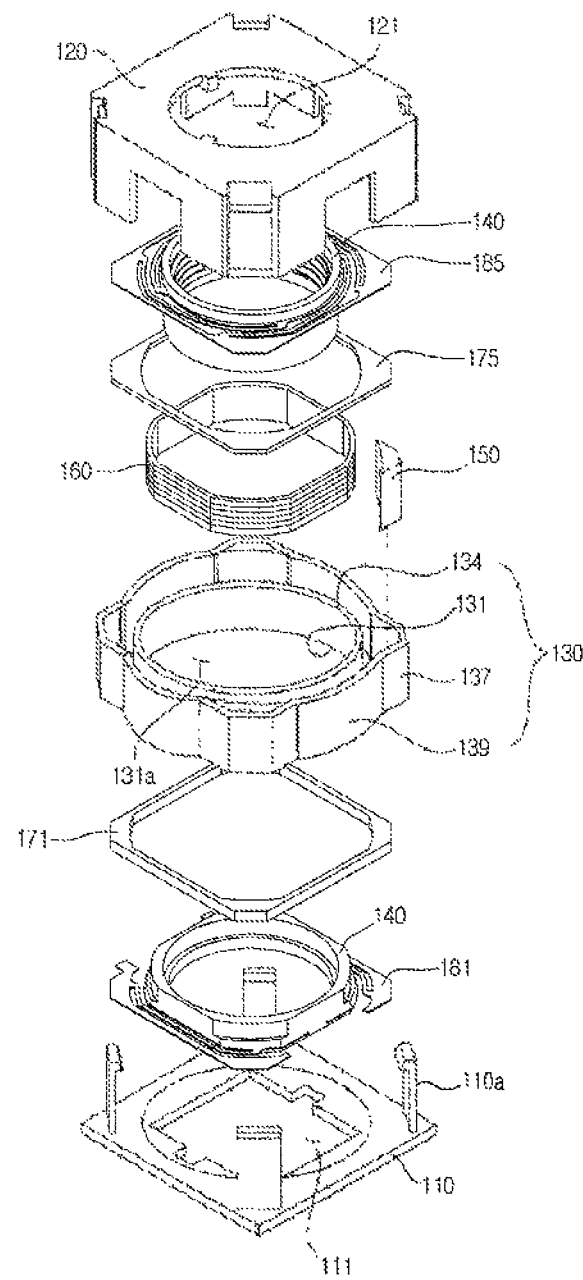

LENS DRIVING APPARATUS

CROSS-REFERENCE TO RELATED APPLICATIONS

This application is a continuation of U.S. application Ser. No. 16/880,212, filed May 21, 2020; which is a continuation of U.S. application Ser. No. 16/207,699, filed Dec. 3, 2018, now U.S. Pat. No. 10,698,173, issued Jun. 30, 2020; which is a continuation of U.S. application Ser. No. 15/987,606, filed May 23, 2018, now U.S. Pat. No. 10,146,026, issued Dec. 4, 2018; which is a continuation of U.S. application Ser. No. 15/449,356, filed Mar. 3, 2017, now U.S. Pat. No. 10,007,082, issued Jun. 26, 2018; which is a continuation of U.S. application Ser. No. 15/008,496, filed Jan. 28, 2016, now U.S. Pat. No. 9,618,722, issued Apr. 11, 2017; which is a continuation of U.S. application Ser. No. 14/632,758, filed Feb. 26, 2015, now U.S. Pat. No. 9,256,049, issued Feb. 9, 2016; which is a continuation of U.S. application Ser. No. 13/952,230, filed Jul. 26, 2013, now U.S. Pat. No. 9,019,624, issued Apr. 28, 2015; which is a continuation of U.S. application Ser. No. 13/659,185, filed Oct. 24, 2012, now U.S. Pat. No. 9,250,414, issued Feb. 2, 2016; which is a continuation of U.S. application Ser. No. 13/302,547, filed Nov. 22, 2011, now U.S. Pat. No. 8,300,330, issued Oct. 30, 2012; which is a continuation of U.S. application Ser. No. 13/051,291, filed Mar. 18, 2011, now U.S. Pat. No. 8,089,703, issued Jan. 3, 2012; which is a continuation of U.S. application Ser. No. 12/518,976, filed Jun. 12, 2009, now U.S. Pat. No. 7,936,526, issued May 3, 2011; which is the U.S. national stage application of International Patent Application No. PCT/KR2007/006466, filed Dec. 12, 2007; which claims priority to Korean Patent Application Nos. 10-2006-0127435, filed Dec. 13, 2006, and 10-2006-0127436, filed Dec. 13, 2006, all of which are incorporated herein by reference in their entirety.

TECHNICAL FIELD

The present invention relates to a lens driving apparatus.

BACKGROUND ART

Recently, as electronic appliances have multi-functions, various electronic appliances having cameras therein, such as MP3 players, mobile communication terminals and PDAs, have been widely used.

Since the electronic appliances equipped with cameras are manufactured in a small size such that a user can carry the electronic appliances, parts for providing camera functions must also be manufactured in a small size. To this end, a dead space must be minimized in a lens driving apparatus that drives a lens of the camera.

Technical Problem

The embodiment provides a lens driving apparatus which can be fabricated in a small size. The embodiment provides a lens driving apparatus in which a dead space is minimized.

Technical Solution

The lens driving apparatus of the embodiment comprises a base formed at a center thereof with a first opening; a housing coupled with the base and having a second opening corresponding to the first opening; a yoke installed on the base and including a horizontal plate having a third opening corresponding to the first opening and a vertical plate protruding upward from the horizontal plate; a bobbin movably installed in the yoke and coupled with a lens module; a coil fixedly disposed around the bobbin; a plurality of magnets provided at the vertical plate of the yoke to face the coil; and a spring installed on at least one of upper and lower portions of the yoke to return the bobbin, which has moved up due to interaction between the magnet and the coil, to its initial position.

Advantageous Effects

The embodiment can provide a lens driving apparatus which can be fabricated in a small size.

The embodiment can provide a lens driving apparatus in which a dead space is minimized.

BRIEF DESCRIPTION OF THE DRAWINGS

FIG. 1 is a sectional view of a lens driving apparatus according to a first embodiment;

FIG. 2 is an exploded perspective view of the lens driving apparatus shown in FIG. 1;

FIG. 3 is a sectional view of a lens driving apparatus according to a second embodiment; and FIG. 4 is an exploded perspective view of the lens driving apparatus shown in FIG. 3.

DETAILED DESCRIPTION

Hereinafter, a lens driving apparatus according to an embodiment will be described with reference to accompanying drawings.

FIG. 1 is a sectional view of a lens driving apparatus according to a first embodiment, and FIG. 2 is an exploded perspective view of the lens driving apparatus shown in FIG. 1.

Referring to FIGS. 1 and 2, the lens driving apparatus includes a base 110 and a housing 120, which are coupled to each other to form a predetermined space therebetween. The base 110 has a polygonal shape (e.g. rectangular plate shape) and a first opening 111 is formed at the center of the base 110. The housing 120 has a hexahedral structure and a bottom surface thereof is opened. Coupling members 110a are provided at corner edges of the base 110. The coupling members 110a protrude upward from the base 110 and are coupled with the housing 120 while making contact with an outer surface and an upper surface of the housing 120.

A second opening 121 is formed in the upper surface of the housing 120 corresponding to the first opening 111 of the base 110. The bottom surface of the base 110 is connected to an electronic appliance (not shown) and a circuit board (not shown) having an image sensor is provided in the first opening 111.

A metal yoke 130 is fixedly disposed between the base 110 and the housing 120. The yoke 130 includes a horizontal plate 131, which has a polygonal shape (e.g. rectangular plate shape) corresponding to the base 110 and is mounted on the base 110, and a vertical plate 135 provided at an outer peripheral portion of the horizontal plate 131 in correspondence with the outer peripheral portion of the housing 120.

A third opening 131a, which corresponds to the first opening 111 of the base 110, is formed in the horizontal plate 131, and the vertical plate 135 protrudes upward from the outer peripheral portion of the horizontal plate 131.

Since the yoke 130 has a rectangular shape corresponding to the shape of the base 110 and the housing 120 and is installed between the base 110 and the housing 120, a dead space may not exist among the base 110, the housing 120 and the yoke 130, and the yoke 130 may not rotate between the base 110 and the housing 120.

A cylindrical bobbin 140 is installed in the yoke 130. The bobbin 140 is movable up and down through the second opening 121. A lens module 200 including a lens and a lens supporter is coupled with the bobbin 140.

A magnet 150 having an angular column structure is fixed to an inner surface of the vertical plate 135 of the yoke 130, and a coil 160 is disposed around the bobbin 140.

The coil 160 has a cylindrical structure or a polygonal structure and faces the magnet 150.

In the embodiment, the coil 160 has a substantially octagonal structure, in which edges of the coil 160 facing the magnet 150 are curved.

At this time, planes of the magnet 150 that face the coil 160 are also curved such that the electromagnetic field can be maximized. That is, the planes of the coil 160 and the magnet 150, which face to each other, have the same curvature.

In the embodiment, a plurality of magnets 150 are disposed at edges of the yoke 130 to minimize the space occupied by the magnet 150.

Therefore, in the outer peripheral surface of the coil 160, an area that faces the magnets 150 is smaller than an area that does not face the magnets 150. In detail, the area that faces the magnets 150 is greater than 20% and smaller than 50% in the outer peripheral surface of the coil 160.

If the area that faces the magnets 150 is less than 20% in the outer peripheral surface of the coil 160, magnetic force is too insufficient to move up the coil 160. In addition, if the area that faces the magnets 150 is greater than 50% in the outer peripheral surface of the coil 160, the space occupied by the magnets 150 is too large.

According to the embodiment, in order to increase the magnetic force while reducing the space occupied by the magnets 150, the magnet 150 has an angular column structure in which a plane of the magnet 140 that faces the coil 160 is curved.

Therefore, the magnet 150 has later faces including a curved plane that faces the coil 160 and at least one flat plane that does not face the coil 160. In the embodiment, the magnet 150 includes one curved plane and three flat planes.

Thus, as current is applied to the coil 160, the coil 160 moves up together with the bobbin 140 due to an electric field generated from the coil 160 and a magnetic field generated from the magnet 150. Accordingly, the lens module 200 coupled with the bobbin 140 is also moved up.

First and second spacers 171 and 175 are installed between a bottom surface of the yoke 130 and the base 110 and between the upper surface of the yoke 130 and the housing 120, respectively. The first and second spacers 171 and 175 have elasticity to compensate for the assembling tolerance between the parts.

In addition, outer peripheral portions of first and second springs 181 and 185 having ring shapes are inserted between the bottom surface of the first spacer 171 and the base 110 and between the upper surface of the second spacer 175 and the housing 120, respectively.

Inner peripheral portions of the first and second springs 181 and 185 are integrally formed with the bobbin 140. As the current being applied to the coil 150 is shut off, the bobbin 140 is moved down by the first and second springs 181 and 185, so that the bobbin 140 returns to its initial position.

Although the embodiment shows the first and second springs 181 and 185, it is also possible to provide only one of the first and second springs 181 and 185.

FIG. 3 is a sectional view of a lens driving apparatus according to a second embodiment, and FIG. 4 is an exploded perspective view of the lens driving apparatus shown in FIG. 3.

Referring to FIGS. 3 and 4, the lens driving apparatus includes a base 110 and a housing 120, which are coupled to each other to form a predetermined space therebetween. The base 110 has a rectangular plate shape and a first opening 111 is formed at the center of the base 110. The housing 120 has a hexahedral structure and a bottom surface thereof is opened.

Coupling members 110a are provided at corner edges of the base 110. The coupling members 110a protrude upward from the base 110 and are coupled with the housing 120 while making contact with an outer surface and an upper surface of the housing 120.

A second opening 121 is formed in the upper surface of the housing 120 corresponding to the first opening 111 of the base 110. The bottom surface of the base 110 is connected to an electronic appliance (not shown) and a circuit board (not shown) having an image sensor is provided in the first opening 111.

A metal yoke 130 is fixedly disposed between the base 110 and the housing 120. The yoke 130 includes a horizontal plate 131, which has a rectangular plate shape corresponding to the base 110 and is mounted on the base 110.

A third opening 131 a, which corresponds to the first opening 111 of the base 110, is formed at the center of the horizontal plate 131. In addition, a ring-shaped vertical wall 134 is formed on the horizontal plate 131 while surrounding the third opening 131a and vertical plates 134 protrude upward from corner edges of the horizontal plate 131. The vertical plates 137 are fixedly supported by edges of the housing 120.

Since the yoke 130 has a rectangular shape corresponding to the shape of the base 110 and the housing 120 and is installed between the base 110 and the housing 120, a dead space may not exist among the base 110, the housing 120 and the yoke 130, and the yoke 130 may not rotate between the base 110 and the housing 120.

A cylindrical bobbin 140 is installed at an inner portion of the vertical wall 134 of in the yoke 130. The bobbin 140 is movable up and down through the second opening 121. A lens module 200 including a lens and a lens supporter is coupled with the bobbin 140.

A magnet 150 having an angular column structure is fixed to an inner surface of the vertical plate 137 of the yoke 130, and a coil 160 is disposed around the bobbin 140. The coil 160 has a cylindrical structure or a polygonal structure and faces the vertical wall 134.

In the embodiment, the coil 160 has a substantially octagonal structure, in which edges of the coil 160 facing the magnet 150 are curved.

At this time, a plane of the magnet 150, which is arranged sequentially to the vertical wall 134, is curved corresponding to the curvature of the coil 160 and the vertical wall 134 such that the electromagnetic field can be maximized. That is, the coil 160, the plane of the magnet 150 facing the coil 160, and the vertical wall 134 have the same curvature.

In the embodiment, a plurality of magnets 150 are disposed at edges of the yoke 130 to minimize the space occupied by the magnet 150.

Therefore, in the outer peripheral surface of the coil 160, an area that faces the magnets 150 is smaller than an area that does not face the magnets 150. In detail, the area that faces the magnets 150 is greater than 20% and smaller than 50% in the outer peripheral surface of the coil 160.

If the area that faces the magnets 150 is less than 20% in the outer peripheral surface of the coil 160, magnetic force is too insufficient to move up the coil 160. In addition, if the area that faces the magnets 150 is greater than 50% in the outer peripheral surface of the coil 160, the space occupied by the magnets 150 is too large.

According to the embodiment, in order to increase the magnetic force while reducing the space occupied by the magnets 150, the magnet 150 has an angular column structure in which a plane of the magnet 140 that faces the coil 160 is curved.

Therefore, the magnet 150 has later faces including a curved plane that faces the coil 160 and at least one flat plane that does not face the coil 160. In the embodiment, the magnet 150 includes one curved plane and three flat planes.

Thus, as current is applied to the coil 160, the coil 160 moves up together with the bobbin 140 due to an electric field generated from the coil 160 and a magnetic field generated from the magnet 150. Accordingly, the lens module 200 coupled with the bobbin 140 is also moved up.

First and second spacers 171 and 175 are installed between a bottom surface of the yoke 130 and the base 110 and between the upper surface of the yoke 130 and the housing 120, respectively. The first and second spacers 171 and 175 have elasticity to compensate for the assembling tolerance between the parts.

In addition, outer peripheral portions of first and second springs 181 and 185 having ring shapes are inserted between the bottom surface of the first spacer 171 and the base 110 and between the upper surface of the second spacer 175 and the housing 120, respectively.

Inner peripheral portions of the first and second springs 181 and 185 are integrally formed with the bobbin 140. As the current being applied to the coil 150 is shut off, the bobbin 140 is moved down by the first and second springs 181 and 185, so that the bobbin 140 returns to its initial position.

Although the embodiment shows the first and second springs 181 and 185, it is also possible to provide only one of the first and second springs 181 and 185.

An outer peripheral portion of the horizontal plate 131, which is arranged between adjacent vertical plates 137 of the yoke 130, has a curvature corresponding to that of the vertical wall 134. In addition, a vertical connection plate 139 that connects the adjacent vertical plates 137 to each other is provided on the outer peripheral portion of the horizontal plate 131 in a curved shape. The vertical connection plate 139 inhibits penetration of impurity and improves the aesthetic appearance of the lens driving apparatus.

INDUSTRIAL APPLICABILITY

The lens driving apparatus according to the embodiment can be manufactured in a small size, and can be applied to various electronic appliances equipped with a camera function.

The invention claimed is:
1. A lens driving apparatus comprising:
a base;
a housing coupled with the base;
a yoke disposed on the base;
a bobbin disposed in the yoke;
a coil disposed around the bobbin;
a plurality of magnets disposed in the yoke to face the coil;
a first spring disposed between the housing and the plurality of magnets; and
a second spring disposed on the base,
wherein the base comprises a first surface and a second surface,
wherein the first surface is higher than the second surface,
wherein the second spring is coupled with the first surface,
wherein the second surface is spaced apart from the second spring,
wherein the bobbin is configured to be coupled with a lens module,
wherein the plurality of magnets include at least four magnets,
wherein each of the plurality of magnets includes an upper surface, a lower surface, and side surfaces,
wherein the side surfaces include a plurality of flat planes,
wherein an upper surface of the housing and an upper surface of the yoke are vertically overlapped, and
wherein a side surface of the housing and a side surface of the yoke are horizontally overlapped.

2. The lens driving apparatus as claimed in claim 1, wherein the base has a first opening at a center thereof, and wherein the second surface is disposed closer to the first opening than is the first surface.

3. The lens driving apparatus as claimed in claim 1, wherein the second spring comprises a first portion corresponding to the first surface and coupled with the base, a second portion coupled with the bobbin, and a third portion corresponding to the second surface and connecting the first portion and the second portion.

4. The lens driving apparatus as claimed in claim 1, wherein the second surface has an area disposed at a corner of the base.

5. The lens driving apparatus as claimed in claim 1, wherein the side surfaces of each of the plurality of magnets include side surfaces facing away from the coil.

6. The lens driving apparatus as claimed in claim 1, wherein an outer peripheral surface of the coil has first regions facing the plurality of magnets and second regions that do not face the plurality of magnets, and
wherein the first regions and the second regions are alternately disposed.

7. The lens driving apparatus as claimed in claim 1, wherein the yoke includes a horizontal plate and a vertical plate protruding from the horizontal plate, and wherein the horizontal plate of the yoke has a polygonal shape and the vertical plate of the yoke is provided at each corner edge of the horizontal plate.

8. The lens driving apparatus as claimed in claim 1, wherein the base has a rectangular shape, and
wherein a coupling member protrudes upward from each corner edge of the base.

9. A lens driving apparatus, comprising:
a base formed at a center thereof with a first opening;
a case coupled with the base and having a second opening corresponding to the first opening;
a bobbin movably disposed between the base and the case;
a coil disposed around the bobbin and including eight side surfaces and eight edges;
a plurality of magnets coupled to the case to face the coil;
a first spring including a first outer portion coupled to the case, a first inner portion coupled to an upper portion of the bobbin, and a first connecting portion connecting the first outer portion and the first inner portion; and a second spring including a second outer portion coupled to the base, a second inner portion coupled to a lower portion of the bobbin, and a second connecting portion connecting the second outer portion and the second inner portion, wherein the plurality of magnets include at least four magnets, wherein each of the plurality of magnets includes an upper surface, a lower surface, and side surfaces, wherein, in an outer peripheral surface of the coil, first regions facing the plurality of magnets and second regions that do not face the plurality of magnets are alternately disposed, and wherein the case includes four recessed portions provided at each corner of an upper surface of the case, respectively, and coupled to the base.

10. The lens driving apparatus as claimed in claim 9, wherein at least one of the four recessed portions is recessed downward from the upper surface of the case.

11. The lens driving apparatus as claimed in claim 9, wherein, in a region in which at least one of the four recessed portions is provided, the upper surface of the case includes a first upper surface, a second upper surface, and a side surface connecting the first upper surface and the second upper surface, and wherein the first upper surface is disposed higher than the second upper surface.

12. The lens driving apparatus as claimed in claim 11, wherein the second opening is provided at the first upper surface.

13. The lens driving apparatus as claimed in claim 9, wherein at least one of the four recessed portions is not overlapped vertically with the first spring.

14. The lens driving apparatus as claimed in claim 9, wherein at least one of the four recessed portions is not overlapped vertically with the plurality of the magnets.

15. The lens driving apparatus as claimed in claim 9, wherein at least one of the four recessed portions is coupled with a coupling portion provided on an upper surface of the base.

16. The lens driving apparatus as claimed in claim 9, wherein the side surfaces of each of the plurality of magnets include a first side surface coupled with an inner surface of the case and a second side surface facing the coil.

17. The lens driving apparatus as claimed in claim 9, comprising a spacer disposed between the upper surface of the case and the upper surface of the plurality of magnets.

18. The lens driving apparatus as claimed in claim 9, wherein the first outer portion of the first spring is overlapped vertically with the upper surface of the case and one of the plurality of magnets.

19. The lens driving apparatus as claimed in claim 9, wherein the base has a rectangular shape and coupling portions protruding upward from each corner edge of the base, respectively, and wherein the coupling portions are coupled with the corresponding recessed portions of the case, respectively.

* * * * *